Patented Apr. 6, 1943

2,315,503

UNITED STATES PATENT OFFICE 2,315,503

ART OF MOLDING COMPOSITE RESINS

Walter S. Crowell, Melrose Park, and George W. Birch, Upper Darby, Pa., assignors to The S. S. White Dental Manufacturing Company, Philadelphia, Pa., a corporation of Pennsylvania No Drawing. Application June 30, 1939
Serial No. 282,061

10 Claims. (Cl. 260—36)

Polymerized alk-acrylic acid ester resins, particularly polymerized methyl methacrylate, require great care in molding to avoid great variations in transverse and other strengths of the articles produced: in all cases, the hard resins lack toughness. The articles produced are clear, strong and heat-resistant, but their brittleness has been a defect which has led experimenters to the use of plasticizers such as the higher alcohol esters of methacrylic acid, dibutyl phthlate, certain natural resins, etc. However, such plasticizers cannot be added in quantity sufficiently to overcome brittleness without likewise producing a loss of stiffness of the material, as the modulus of elasticity becomes very low and the material tends to take a permanent set upon strain.

Likewise, vinyl ester polymer resins have many valuable characteristics. For example, interpolymers of vinyl acetate and chloride have been prepared, containing from 10 to 90 percent of each of these esters. The polymerized vinyl chloride tends to form aggregates of higher molecular weight while the vinyl acetate is relatively weaker and softer and yields more readily to various solvents, and even permits the penetration of moisture under some conditions. It has been sought to remedy some of the defects of vinyl ester polymer resins by so conducting the polymerization or interpolymerization that molecules of great molecular weight are produced, in association with molecules of lesser condensation, and to separate the resultant mixture and employ the portion having the greater molecular weight, as a more stable and resistant resin base.

In this description and in the claims, by "vinyl ester polymer resins" are meant resins produced by polymerization of vinyl esters, vinyl chloride being considered a vinyl ester.

A characteristic of the vinyl ester polymer resins is that the tough resinous material requires a temperature in excess of 300 to 310° F. for effecting the union and molding of the articles, and the resins begin to scorch or decompose when heated to around 315° F.: this decomposition is indicated by the fact that such molded vinyl ester polymer resins, without added coloring matter, are usually of a brownish shade. It has been found advantageous to employ certain stabilizers, such as calcium stearate, for the purpose of restricting decomposition of the vinyl ester polymer resins, which tend upon heating to form an acid which acts as a catalyst to promote further decomposition.

It has now been found, however, that intimate composite mixtures of methyl methacrylate resins and vinyl ester polymer resin have properties superior to those of either individual component, although it is usually accepted that mixtures of resins behave as though one resin is a filler for the other, upon mechanical mixing, and that good results are unlikely as such mixtures have lesser strengths than either component alone. The vinyl ester polymer resin, in such an intimate composite mixture, operates as a toughener of the methyl methacrylate, but does not produce the loss of stiffness which occurs with employment of the aforesaid plasticizers. The necessary intimate mixture cannot be prepared by the usual or mechanical mixing of the resins in a Banbury mill, for example, but must be effected by inter-polymerization, or by employment of the initial material of one resin as a plasticizer for the other resin, with a subsequent hardening of such initial material by polymerization thereof. Since vinyl chloride is a gas at normal temperature, and vinyl acetate is a volatile liquid, and vinyl ester polymer resins require purification to eliminate strength-reducing substances, it is preferred to use monomeric methyl methacrylate as a plasticizer, and then to effect polymerization of the methacrylate. Further, the plasticized mixture is much more plastic than either resin, and can be easily shaped and molded.

As examples of the physical properties of such mixtures, by way of comparison with the simple vinyl ester polymer or methyl methacrylate resins, and with rubber or the phenolformaldehyde resins, the following tabulation indicates the strengths which have been obtained:

| Resin | Vinyl | MMA | 15% vinyl 85% MMA | 30% vinyl, 70% MMA | Hard rubber | Phenol-formaldehyde |
|---|---|---|---|---|---|---|
| Stabilizer | 1% | ¾₀ | ¾₀ | ¾₀ | | |
| Transverse strength | 15,000 | 18,000 | 18,800 | 23,000 | 15,000 | 12,000 |
| Impact | 800+ | 128 | 175 | 188 | 450 | 100 |

MMA designates methyl methacrylate.

The stabilizer employed was aluminum hydroxide; and benzoyl peroxide was added in small quantity as a catalyzer.

The monomeric methyl methacrylate does not substantially dissolve the types of vinyl ester polymer resins which contain relatively high proportions of vinyl chloride—that is, those which tend to have the highest molecular weight. Thus, with an excess of monomeric methyl methacrylate (15 percent of vinyl resin, 85 percent of monomer liquid), the particles of vinyl ester polymer resin retain their individuality and form, but are greatly swollen and softened, and appear to float easily in the monomer liquid, and settle slowly owing to a relatively small difference in specific gravities: very little of the vinyl ester polymer resin appears to enter into true solution. On the other hand, the monomeric methyl methacrylate penetrates into and softens these materials by a swelling action, so that the consistency at, say, 35 to 40 percent of monomeric methyl methacrylate is that of a hand-plastic gum which is not sticky or tacky but which may be readily cut and shaped for packing into molds, and readily yields under pressure to fill the molds before being heated for final consolidation and hardening.

The mixtures containing the higher percentages of monomeric methyl methacrylate are of particular advantage where it is necessary to follow irregular molds, and where the operation must be conducted at relatively low temperatures. For example, when it is sought to make a denture, it is presently necessary to utilize molds which accurately reproduce the walls of the oral cavity upon which the denture is to be seated; and it is customary to employ plaster molds for the purpose. Such plaster molds are weak and do not withstand high pressures or temperatures in the molding and condensing operations. It has been found, therefore, that mixtures containing 30 to 40 percent of the methacrylate monomer are highly advantageous for such employments, and it is presently preferred to employ mixtures containing 35 percent of the methacrylate monomer. On the other hand, such dentures have to withstand temperatures as high as 140 degrees F. in the mouth, and sometimes temperatures as high as 160 degrees F. The softening points of the aforesaid mixtures, after proper hardening, make them excellently adapted for use as dentures, as the material employed as a plasticizer during the forming operation is later converted to a resin itself.

It has been found, however, that an optimum proportion of methacrylate polymer to vinyl ester polymer for a particular purpose often would require so large a proportion of the methacrylate monomer in the initial substance that the mixture is too soft for convenient handling. For example, when more than 50 percent of monomeric methyl methacrylate is present, the material flows under its own weight, and it cannot be supplied in the form-maintaining sticks or sheets. It has been found, however, that the methacrylate may be incorporated, partly as a polymer and partly as a monomer: and in particular it has been found that a proportion of 60 parts of polymer (total vinyl ester polymer and methacrylate resins) to 40 parts of monomer (methyl methacrylate) is a desirable ratio as the mixture is hand-plastic, can be formed cold under a pressure of 2500 pounds per square inch or less, and can thereafter be cured in an oven or autoclave under a sufficient pressure to assure a proper "follow up."

It is feasible to color such materials, as for example by utilizing pigmentary colors in forming the original resin crepe, or by using colors which are soluble in the methacrylate liquid during the course of the mixing operation. Further, it is possible to prepare various batches of different colors, and then selectively or indiscriminately fill the mold with such mixtures of differing colors.

The following examples of the procedure and of the articles formed thereby indicate the effects of proportions and conditions. For each of the columns below, a particular mixture was provided, molded and cured, and the tests indicate the behavior of successive specimens produced from these proportions and under these conditions.

|  | Sample No. | | | |
| --- | --- | --- | --- | --- |
|  | A-1 | B-1 | B-4 | B-5 |
| Vinyl ester polymer resin | 100 | 0 | 15 | 30 |
| MMA polymer | 0 | 60 | 45 | 30 |
| MMA monomer | 0 | 40 | 40 | 40 |
| Stabilizer_____percent | 1.0 | 0.3 | 0.15 | 0.3 |
| Catalyst (based on monomer)_____percent | 0 | 0.05 | 0.05 | 0.05 |
| Mixing process | Banbury mixer | | | |
| Molding temperature °F | 320 | 150 | 150 | 200 |
| Curing temperature °F | 0 | 280 | 250 | 250 |
| Curing time_____minutes | 0 | 60 | 60 | 60 |
| Color | Clear brown | No discoloration | | |
| Defects | None | None | None | None |
| Transverse strength p.s.i. | 6,900 | 15,900 | 16,400 | 19,000 |
|  | 14,200 | 18,200 | 18,200 | 23,300 |
|  | 15,200 | 18,900 | 19,400 | 23,600 |
|  | 16,600 | 19,400 | 21,100 | 24,800 |
| Average | 13,200 | 18,000 | 18,800 | 23,000 |
| Izod impact inch lbs./sq. in. | 26 | 127 | 171 | 168 |
|  | 48 | 127 | 173 | 183 |
|  | 48 | 128 | 177 | 193 |
|  | 141 | 129 | 179 | 206 |
| Average | 66 | 128 | 175 | 188 |

From these examples, it will be noted that the strength is more uniform, with the addition of the stabilizer, and that the transverse strength and impact strength have been increased by the procedure, partly because of the addition of the methacrylate monomer, which in its polymerized condition results in improvement of these strengths and partly by the proportionation of the stabilizer employed. In each of these examples, the vinyl resin was a high-chloride, high-molecular-weight resin, and the catalyst employed was benzoyl peroxide.

The vinyl ester polymer and methacrylate resins in crepe or granule form may be introduced into a Banbury mill (preferably with cooling of the mill by cold water to avoid polymerization of the monomer), along with the desired quantity of methacrylate monomer, with the usual precautions, and they are worked to a homogeneous mass. The swelled granules produced by a tumbling operation, or by the mere standing of the resin granules in methacrylate monomer, can be similarly worked up into a substantially homogeneous mass. Fillers, opaquing-agents, and coloring material may be introduced during the working on the Banbury mixer.

The presence of the material in the form of a homogeneous mass is excellent for employment in making dentures, as it can be supplied in sealed containers and utilized by the dentist, by cutting into blocks or fragments, for filling a mold which is then subjected to heat and pressure for the shaping, uniting and hardening. The stabilized material has a substantial shelf-life, as pointed out hereinafter, and it is feasible to re-plasticize it by a further tumbling operation with more methacrylate liquid, as the time-hardening has merely changed the methacrylate monomer into methacrylate polymer which itself is a resin.

As examples of practice may be set out the following:

Example I 15 parts by weight of high-molecular vinyl ester polymer resin and 70 parts by weight of polymerized methyl methacrylate resin are mixed with 15 parts of monomeric methyl methacrylate in a Banbury mill, with 0.05 percent of benzoyl peroxide, based on the monomer, as a catalyst. The resins are preferably in the form of comminuted particles prepared by a cutting grinder. The working is continued with a water cooling of the mill to prevent excessive escape of vapors of the monomer, until the kneaded mass is uniform. This material is molded and polymerized at a temperature of 250 degrees F. and at a pressure of 2500 pounds. It is preferred to include $\frac{1}{10}$ of 1 percent of aluminum hydroxide or other suitable stabilizers, as pointed out hereinafter, for the purpose of assuring freedom from bubbles or flaws.

Example II 30 parts of vinyl ester polymer resin and 55 parts of methyl methacrylate resin are worked up in a Banbury mill with 15 parts of monomeric methyl methacrylate, as in Example I. The product can be molded and polymerized under the conditions of Example I.

Example III 15 parts of vinyl ester polymer resin and 45 parts of methyl methacrylate resin are mixed in a Banbury mill with 40 parts of monomeric methyl methacrylate. The product is a rubbery mass which is hand-plastic, can be readily cut with shears or a knife, can be bent with the fingers for packing into a mold, and hence is easily handled for cold-molding into pre-shapes which can be employed in a hot final-molding operation for the easy production of stable articles; and can also be employed directly in packing denture molds, for example. It can then be polymerized under a pressure of less than 2500 pounds and at a temperature of 250 degrees F. or less. Thus, the material can be used in a denture mold of plaster which is filled with appropriately cut pieces of the initial material, and pressed cold into the form of the denture plate: the mold with its contents is then transferred to an autoclave and heated by steam at a temperature of 250 degrees F. for an hour while pressing the parts of the mold together mechanically.

Example IV 50 parts of vinyl ester polymer resin and 10 parts of methyl methacrylate resin are similarly mixed with 40 parts of monomeric methyl methacrylate, and can be molded as in Example III.

It has been found that advantageous denture plate materials, for example, may be made by using from 15 to 60 percent of vinyl ester polymer resin with 10 to 40 percent of monomer, the remainder being comprised of methyl methacrylate polymer. With less than 10 percent of vinyl ester polymer resin, there is not a sufficient effect upon the properties of the methyl methacrylate resin to indicate advisability of preparing the mixture. It is preferred to employ between 25 and 40 percent of the vinyl ester polymer resin. On the other hand, when much less than 10 percent of monomeric methyl methacrylate is employed, the mixture is so tough that it can only be molded satisfactorily at temperatures above 300 degrees F., and there is danger of degeneration of the vinyl resin.

The methyl methacrylate monomer tends to shrink about 20 percent in volume during the course of its hardening, and the shrinkage of mixtures originally containing around 40 percent of the monomer liquid will therefore amount to about 8 percent of the total volume, or a linear shrinkage of about 2 percent, which closely approximates the shrinkage of rubber during the course of vulcanizing. This shrinkage, however, is overcome by molding and hardening under high pressures, or by using molds which follow up as the contents shrink.

Reference has above been made to the desired presence of stabilizers in such materials. It has been found that calcium stearate and other materials which have been accepted as suitable for employment with vinyl ester polymer resins are not proper for inclusion while preparing the aggregate of vinyl ester polymer resin with polymerized methyl methacrylate, owing to inherent differences between the progenitors of the vinyl polymer and the methacrylate polymer. The vinyl ester polymer resins upon heating tend to form acids which promote decomposition: and hence various alkalis and salts of acids (such as stearic acid, i. e. normally those weaker than acetic acid) are introduced as stabilizers. These stabilizers are also desirable during the course of polymerization of the vinyl ester polymer resin, as this polymerization is restricted and almost inhibited by the presence of acids. On the other hand, the polymerization of methyl methacrylate is correspondingly inhibited by bases, and is promoted by acids and proceeds best at about pH 5.5. Thus, there is incompatability between many normal stabilizers or polymerization-accelerants for resins of the vinyl ester polymer group and resins of the methacrylate group.

It has been found that aluminum hydroxide is a satisfactory stabilizing agent for assuring uniformity of product according to the present method, as it appears to operate satisfactorily both for protecting the vinyl ester polymer resin and for the purpose of assuring the proper condensation of the methacrylate monomer, and for the preservation of the methacrylate polymer which is formed. In addition, it has been found that triphenyl tin hydroxide (proposed for vinyl resins in French Patent 829,713) and like organo-metallic compounds, are satisfactory, as well as lanthanum and beryllium hydroxides. The quantity of stabilizer to be employed depends somewhat on the molecular condition of the vinyl ester polymer resin, and upon the particular agent employed. It has been found that aluminum hydroxide is effective in a proportion of one-twentieth of one percent of the vinyl ester polymer resin present; and that proportions up to 15 per cent of the vinyl ester polymer resin may be employed. It is preferred to employ about one-half of one percent when making clear or transparent resin articles; to use between 1 and 2 percent of aluminum hydroxide in forming articles which are to be translucent, as the higher proportions of aluminum hydroxid tend to produce a cloudiness in the mass; while for opaque articles higher percentages may be used, as the excess is chemically inert and operates largely as a filler for the material. The desirability of increasing a relatively low proportion of such a stabilizer is indicated by the appearance of bubbles, or by low or irregular strength in the hardened mass. Proper quantities of other stabilizers can be similarly ascertained; for example, three-tenths of one percent of beryllium hydroxide appears to be the effective minimum.

If handling and processing are carried out with sufficient care and at sufficiently low temperatures, it is not essential to provide stabilizers, since no significant or objectionable decomposition of the vinyl ester polymer resin will occur; but it is desirable to employ a stabilizer, even if only in small quantities, as it reduces the difficulties of handling and the precautions which must be observed.

The behavior, strength, etc., of the material approaches that of an inter-polymer, but differs therefrom in the ease of production, as extensive apparatus and precautions are required in producing inter-polymers of vinyl and methacrylate resins owing to the low boiling points of the initial vinyl esters; and there is not the capability of simple pressure molding and hardening.

In the above description, monomeric methyl methacrylate has been set out, as it is the presently preferred material for employment: but it will be understood that other acrylic and alk-acrylic esters may be employed which have the properties of liquidity at room temperature, ability to swell vinyl ester polymer resins, and remain without excessive volatilization at molding and curing temperatures. Different properties of final articles are obtained, according to the particular ester selected: and some of the bodies remain relatively soft or flexible after hardening, which is of value for some employments. Since many such articles require relative rigidity and great resistance to moisture penetration (such as denture plates, tumblers, and other articles subject to moisture in use), the methyl methacrylate has been set out as the preferred form owing to its excellent properties in these respects.

It is obvious that other combinations than those specifically set out may be employed, and that the steps of the procedure may be modified without departing from the scope of the appended claims.

We claim:

1. The process of producing a moldable mass having a composite base of vinyl and methyl methacrylate resins, which comprises treating a mixture of 10 to 60 parts of high-chloride-content vinyl-ester-polymer resin of inter-polymerized vinyl acetate and vinyl chloride and 30 to 80 parts of methyl methacrylate polymer resin with monomeric methyl methacrylate until the resins are swollen but not dissolved, from 10 to 50 percent of the swollen mass being methyl methacrylate monomer.

2. The process of producing a moldable mass having a composite base of vinyl and methyl methacrylate resins, which comprises kneading a mixture of 10 to 60 parts of high-chloride-content vinyl-ester-polymer resin of inter-polymerized vinyl acetate and vinyl chloride and 30 to 80 parts of methyl methacrylate polymer resin with monomeric methyl methacrylate until the resins are swollen but not dissolved, from 10 to 50 percent of the swollen mass being methyl methacrylate monomer.

3. The process of producing a shaped article from a mass having a composite base of vinyl and methyl methacrylate resins, which comprises treating a mixture of 10 to 60 parts of high-chloride-content vinyl-ester-polymer resin of inter-polymerized vinyl acetate and vinyl chloride and 30 to 80 parts of methyl methacrylate polymer resin with monomeric methyl methacrylate until the resins are swollen but not dissolved, from 10 to 50 percent of the swollen mass being methyl methacrylate monomer, and shapping the swollen mass under pressure and at a hardening temperature below 300 degrees F. until the polymerization of the methacrylate monomer is effected.

4. The process of producing a moldable mass having a synthetic resinous base of vinyl and methyl methacrylate resins, which comprises treating a mixture of 15 to 30 parts of high-chloride-content vinyl-ester-polymer resin of inter-polymerized vinyl acetate and vinyl chloride and 45 to 30 parts of methyl methacrylate resin with monomeric methyl methacrylate substantially in the proportion of 35 parts of the monomer per 65 parts of the combined resins, and effecting homogeneous distribution of the resins and monomer.

5. A moldable composition capable of hardening upon heating to a temperature below 300 degrees F. and thereby yielding an article having combined hardness, toughness and impact properties superior to those of the constituent individual resins, comprising a synthetic resinous base of an intimate homogeneous mixture of 10 to 60 parts of high-chloride-content vinyl-ester-polymer resin of inter-polymerized vinyl acetate and vinyl chloride, and 30 to 80 parts methyl methacrylate polymer resin, with monomeric methyl methacrylate, and characterized in having the consistency of a non-sticky, hand-plastic mass and being readily conformable to a mold at room temperature and containing the methyl methacrylate monomer in the proportion of 10 to 50 percent of the swollen mass distributed throughout the said mass as a swelling and softening agent for the vinyl and methyl methacrylate resins.

6. A moldable composition capable of hardening upon heating to a temperature below 300 degrees F. and thereby yielding an article having combined hardness, toughness and impact properties superior to those of the constituent individual resins, comprising a synthetic resinous base of an intimate homogeneous mixture of 15 to 30 parts of high-chloride-content vinyl-ester-polymer resin of interpolymerized vinyl acetate and vinyl chloride and 45 to 30 parts of methyl methacrylate polymer resin, with monomeric methyl methacrylate in the proportion of substantially 35 parts for each 65 parts of the combined vinyl and methacrylate polymer resins distributed throughout the said base as a swelling and softening agent for the vinyl and methyl methacrylate resins, and characterized in having the consistency of a non-sticky, hand-plastic gum and being readily conformable to a mold at room temperature.

7. A moldable composition capable of hardening upon heating to a temperature below 300 degrees F. and thereby yielding an article having combined hardness, toughness and impact properties superior to those of the constituent individual resins, comprising a synthetic resinous base of an intimate homogeneous mixture of 10 to 60 parts of high-chloride-content vinyl-ester-polymer resin of inter-polymerized vinyl acetate and vinyl chloride, and 30 to 80 parts of methyl methacrylate polymer resin, with monomeric methyl methacrylate and also including one-tenth to two percent of a stabilizer selected from the group consisting of aluminum hydroxide, beryllium hydroxide and triphenyl tin hydroxide and effective jointly on the vinyl-ester-polymer resin and on the methyl methacrylate, and characterized in having the consistency of a nonsticky, hand-plastic mass and being readily conformable to a mold at room temperature, and containing methyl methacrylate monomer in the proportion of 10 to 50 percent of the swollen mass distributed throughout the said mass as a swelling and softening agent for the vinyl and methyl methacrylate resins.

8. A denture made according to the process of claim 1, comprising a hard mass having a resin base comprising 10 to 60 parts of high-chloride-content vinyl-ester-polymer resin of interpolymerized vinyl acetate and vinyl chloride and 40 to 130 parts of methyl methacrylate resin, the mass being characterized in withstanding the temperature of at least 140 degrees F. without objectionable softening and having uniform properties of strength, a transverse strength value in excess of at least 16,400 and an Izod impact strength of at least 168.

9. A denture made according to the process of claim 4, comprising a hard mass having a resin base comprising 15 to 30 parts of high-chloride-content vinyl-ester-polymer resin of inter-polymerized vinyl acetate and vinyl chloride and 85 to 70 parts of methyl methacrylate resin, the mass being characterized in withstanding the temperature of at least 140 degrees F. without objectionable softening and having uniform properties of strength, a transverse strength value in excess of at least 16,400 and an Izod impact strength of at least 168.

10. A denture made according to the process of claim 1, comprising a hard mass having a resin base comprising high-chloride-content vinyl-ester-polymer resin of interpolymerized vinyl acetate and vinyl chloride and methyl methacrylate resin, between 25 and 40 percent of the resin base being the vinyl-ester-polymer resin, and also comprising a stabilizer selected from the group consisting of aluminum hydroxide, beryllium hydroxide and triphenyl tin hydroxide, said stabilizer being present in the amount of substantially one-twentieth to fifteen percent of the weight of the vinyl-ester-polymer resin, the mass being characterized in withstanding the temperature of at least 140 degrees F. without objectionable softening and having uniform properties of strength, a transverse strength value in excess of at least 15,900 and an Izod impact strength of at least 124.

WALTER S. CROWELL.
GEORGE W. BIRCH.